(12) United States Patent
Berruet et al.

(10) Patent No.: US 9,644,729 B2
(45) Date of Patent: May 9, 2017

(54) MECHANICAL SYSTEM FORMING A CAM FOLLOWER OR A ROCKER ARM, INJECTION PUMP OR VALVE ACTUATOR COMPRISING SUCH A MECHANICAL SYSTEM AND METHOD FOR MANUFACTURING SUCH A MECHANICAL SYSTEM

(71) Applicants: Nicolas Berruet, Artannes sur Indre (FR); François Champalou, Chaumont-sur-Loire (FR); Benoît Hauvespre, Saint Etienne de Chigny (FR); Guillaume Jouanno, Plouha (FR); Samuel Viault, Saint-Antoine-du-Rocher (FR)

(72) Inventors: Nicolas Berruet, Artannes sur Indre (FR); François Champalou, Chaumont-sur-Loire (FR); Benoît Hauvespre, Saint Etienne de Chigny (FR); Guillaume Jouanno, Plouha (FR); Samuel Viault, Saint-Antoine-du-Rocher (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/945,574

(22) Filed: Nov. 19, 2015

(65) Prior Publication Data
US 2016/0160986 A1  Jun. 9, 2016

(30) Foreign Application Priority Data
Nov. 27, 2014  (EP) .................................... 14306905

(51) Int. Cl.
*F16H 53/06* (2006.01)
*F01L 1/14* (2006.01)
(Continued)

(52) U.S. Cl.
CPC ................ *F16H 53/06* (2013.01); *F01L 1/14* (2013.01); *F01L 1/18* (2013.01); *F02M 59/102* (2013.01);
(Continued)

(58) Field of Classification Search
CPC .. F16H 53/06; F16H 53/08; F01L 1/14; F01L 1/18; F01L 2015/02; F01L 2105/02;
(Continued)

(56) References Cited

U.S. PATENT DOCUMENTS 4,204,814 A    5/1980  Matzen
4,231,267 A   11/1980  Van Slooten
(Continued)

FOREIGN PATENT DOCUMENTS

DE        102009013131 A1    9/2010
EP            1657458 A1     5/2006
(Continued)

*Primary Examiner* — Adam D Rogers
(74) *Attorney, Agent, or Firm* — Bryan Peckjian; SKF USA Inc. Patent Dept.

(57) ABSTRACT

A mechanical system forms a cam follower or a rocker arm and includes a support element, a pin extending between two opposite ends along a first axis and supported by the support element, and a roller mounted on the pin, movable in rotation relative to the pin around the first axis and adapted to roll on a cam. The support element includes a first axial abutment feature blocking the translation of a pin assembly including at least the pin, in a first direction parallel to a second axis perpendicular to the first axis. The mechanical system additionally includes an insert inserted in the support element and supporting the pin opposite the first axial abutment feature, wherein the first axial abutment feature protrudes outside a cavity delimited by the support element and receiving the pin.

14 Claims, 9 Drawing Sheets

(51) Int. Cl.
*F02M 59/10* (2006.01)
*F04B 1/04* (2006.01)
*F04B 9/04* (2006.01)
*F01L 1/18* (2006.01)

(52) U.S. Cl.
CPC ............ *F04B 1/0426* (2013.01); *F04B 9/042* (2013.01); *F01L 2105/02* (2013.01); *F01L 2107/00* (2013.01); *F02M 2200/8038* (2013.01); *F02M 2200/8053* (2013.01); *F02M 2200/8061* (2013.01)

(58) Field of Classification Search
CPC .............. F01L 2107/00; F02M 59/102; F02M 2200/8038; F02M 2200/8053; F02M 2200/8061; F04B 1/0426; F04B 9/042
See application file for complete search history.

(56) References Cited

U.S. PATENT DOCUMENTS

| | | | |
|---|---|---|---|
| 6,302,075 B1 | 10/2001 | Krieg | |
| 7,793,583 B2* | 9/2010 | Radinger | F01L 1/143 74/569 |
| 8,607,754 B2* | 12/2013 | Dorn | F01L 1/146 123/90.44 |
| 8,875,676 B2* | 11/2014 | Geyer | F01L 1/14 123/90.48 |
| 9,217,407 B2* | 12/2015 | Bauman | F16H 53/06 |
| 9,291,247 B2* | 3/2016 | Dorn | F02M 59/102 |
| 9,528,397 B2* | 12/2016 | Berruet | F02M 59/102 |
| 2014/0150602 A1 | 6/2014 | Hauvespre et al. | |
| 2014/0251283 A1 | 9/2014 | Bauman et al. | |
| 2015/0082938 A1* | 3/2015 | Schick | F01L 1/14 74/569 |
| 2015/0090209 A1* | 4/2015 | Berruet | F04B 1/0439 123/90.26 |
| 2015/0090211 A1* | 4/2015 | Champalou | F01L 1/14 123/90.48 |
| 2015/0096515 A1* | 4/2015 | Berruet | F02M 37/06 123/90.48 |
| 2016/0091073 A1* | 3/2016 | Berruet | F16H 53/06 74/559 |
| 2016/0153321 A1* | 6/2016 | Berruet | F02M 59/102 123/90.44 |
| 2016/0153322 A1* | 6/2016 | Berruet | F02M 59/102 74/559 |
| 2016/0230868 A1* | 8/2016 | Champalou | F01L 1/14 |
| 2016/0281667 A1* | 9/2016 | Berruet | F02M 59/102 |
| 2016/0305290 A1* | 10/2016 | Guillaume | F01L 1/16 |
| 2016/0312665 A1* | 10/2016 | Jouanno | F02M 59/102 |

FOREIGN PATENT DOCUMENTS

| | | |
|---|---|---|
| WO | 2008068116 A1 | 6/2008 |
| WO | 2013119214 A1 | 8/2013 |

* cited by examiner

MECHANICAL SYSTEM FORMING A CAM FOLLOWER OR A ROCKER ARM, INJECTION PUMP OR VALVE ACTUATOR COMPRISING SUCH A MECHANICAL SYSTEM AND METHOD FOR MANUFACTURING SUCH A MECHANICAL SYSTEM

CROSS REFERENCE TO RELATED APPLICATIONS

This is a Non-Provisional Patent Application, filed under the Paris Convention, claiming the benefit of Europe (EP) Patent Application Number 14306905.2, filed on 27 Nov. 2014 (27 Nov. 2014), which is incorporated herein by reference in its entirety.

TECHNICAL FIELD OF THE INVENTION

The invention concerns a mechanical system, forming a cam follower or a rocker arm, and comprising a pin or a roller. The invention also concerns an injection pump or a valve actuator comprising such a mechanical system. Finally, the invention concerns a method for manufacturing such a mechanical system.

BACKGROUND OF THE INVENTION

Classically, a cam follower comprises at least a tappet, a pin and a roller. The tappet extends along a longitudinal axis, while the pin and the roller are centered on a transversal axis. The tappet is formed with two lateral flanges, delimiting an intermediate gap between them and each comprising a cylindrical bore. The roller is positioned in the intermediate gap, between both flanges and bores. The pin is fitted in the two bores, such that the roller is movable in rotation relative to the pin around its axis. The pin may be caulked, in other words plastically deformed, on both opposite ends to create a mechanical connection by press-fit in the tappet bores.

When the cam follower is in service, the roller collaborates with a cam synchronized with the internal combustion engine camshaft. The rotation of the camshaft leads to a periodic displacement of a piston of the pump that rests against the tappet, to allow fuel to be delivered. The tappet is movable back and forth along the longitudinal axis in a bore belonging to the injection pump, with the cylindrical outer surface of the tappet sliding in this bore. The roller is movable in rotation around its central axis. The body of tappet is in one piece, made by forging.

As shown by example in EP-A-2 607 636, it is known to provide the tappet with a single piece body equipped with two flanges having holes for supporting the ends of the pin on which the roller is mounted. The holes in the flanges each have a radial recess adapted to receive a plastically deformed radial portion of the caulked end of the pin. For assembling the cam follower, the roller is mounted between the flanges of the tappet. Then, the pin is inserted in the roller, through the holes of the flanges, the ends of the pin being supported by the flanges. Then, the ends of the pin are caulked. The assembly of the tappet is time consuming. Besides, the body of the tappet has to be machined, which is long and expensive.

SUMMARY OF THE INVENTION

The aim of the invention is to provide an improved mechanical system easy to assemble and having a reduced cost.

To this end, the invention concerns a mechanical system forming a cam follower or a rocker arm, the mechanical system comprising:
- a support element,
- a pin extending between two opposite ends along a first axis and supported by the support element, and
- a roller mounted on the pin, movable in rotation relative to the pin around the first axis and adapted to roll on a cam,
- the support element comprising first axial abutment feature blocking the translation of a pin assembly including at least the pin, in a first direction parallel to a second axis perpendicular to the first axis, the mechanical system comprising an insert inserted in the support element and supporting the pin opposite the first axial abutment feature,
- wherein the first axial abutment feature protrudes outside a cavity delimited by the support element and receiving the pin.

Thanks to the invention, axial abutment feature blocks the pin inside the tappet, so assembling the mechanical system is simplified.

According to further aspects of the invention which are advantageous but not compulsory, such a mechanical system may incorporate one or several of the following features:
- The support element comprises a cylindrical wall extending around the pin and blocking the translation of the pin along the first axis.
- The pin assembly includes only the pin.
- The pin assembly further includes the insert.
- The insert is in a single piece and has holding members supporting the pin ends.
- In an alternative, the insert is made from separate parts and includes a first holding portion and a second holding portion supporting the pin.
- The insert is glued or press-fitted inside the support element.
- The mechanical system includes second abutment feature blocking the translation of the pin assembly and of the insert, in a second direction opposite the first direction and the second abutment feature includes protrusions made by stamping a cylindrical wall of support element, or elastic holding members.

Another aspect of the invention concerns an injection pump for a motor vehicle, comprising a mechanical system according to the invention.

Another aspect of the invention concerns a valve actuator for a motor vehicle, comprising a mechanical system according to the invention.

Another aspect of the invention concerns a first method for manufacturing a mechanical system according to the invention, wherein:
- the pin and the roller are assembled together,
- the pin and the roller are inserted in the support element until the pin assembly comes into contact with first axial abutment feature,
- the insert is inserted in the support element until it comes into contact with the pin.

Another aspect of the invention concerns a second method for manufacturing a mechanical system having an insert made from separate parts and including a first holding portion and a second holding portion supporting the pin, each holding portion having a cylindrical recess having a diameter roughly equal to the diameter of the pin, and wherein:

the pin and the roller are assembled together, the holding portions of the insert are assembled with the pin, with the pin ends inside the cylindrical recesses, the pin assembly is inserted inside the support element until it comes into abutment with the first axial abutment feature.

BRIEF DESCRIPTION OF THE DRAWINGS

The invention will now be explained in correspondence with the annexed figures, as an illustrative example, without restricting the object of the invention. In the annexed figures.

DETAILED DESCRIPTION OF SOME EMBODIMENTS

Figure 1:
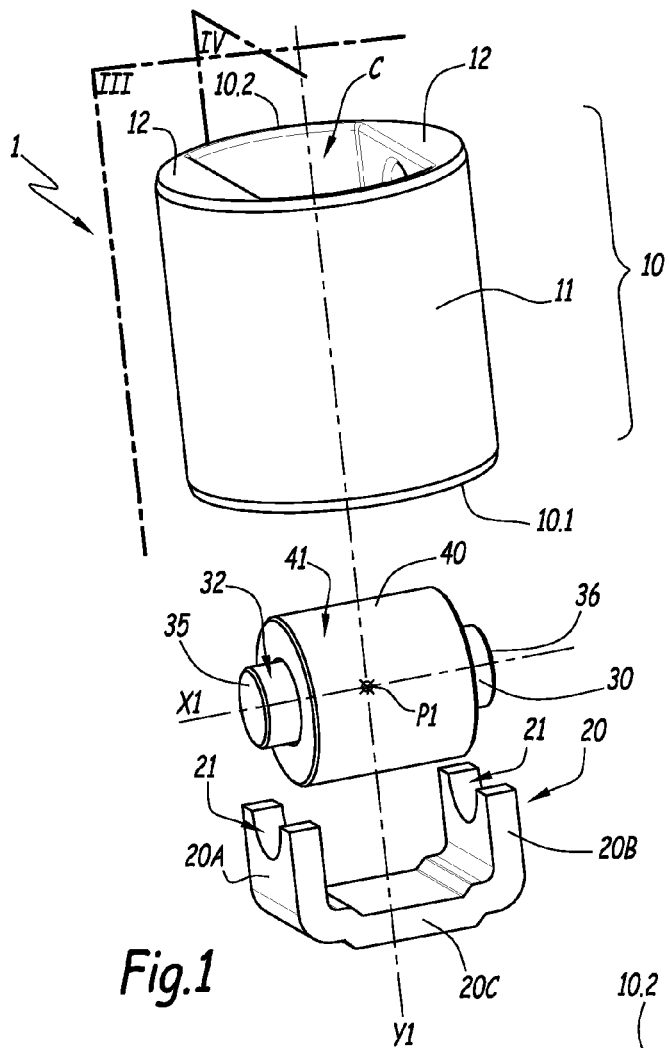
FIG. 1 is an exploded perspective view of a mechanical system according to a first embodiment, of the cam follower type.
Figure 2:
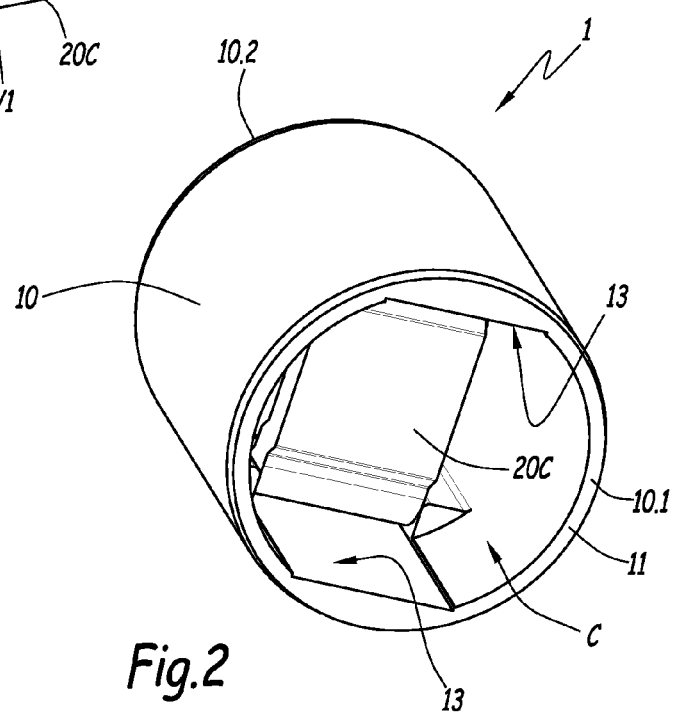
FIG. 2 is a perspective view of the mechanical system of FIG. 1.
Figure 3:
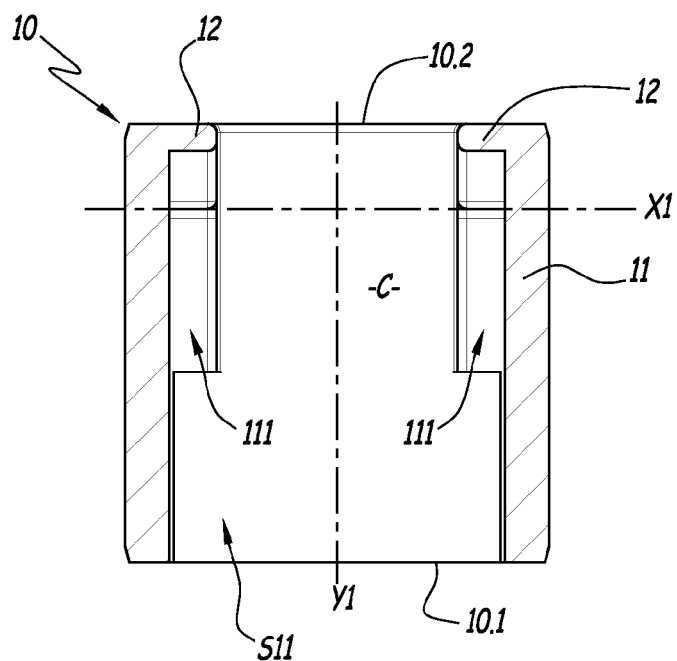
FIG. 3 is a sectional view of the tappet of the mechanical system of FIGS. 1 and 2 along plane III of FIG. 1.

The mechanical system 1, or mechanical member, represented on FIGS. 1 to 6 is of the cam follower type, adapted to equip an injection pump for a motor vehicle, not shown.

Mechanical system 1 comprises a support element or tappet 10, an insert 20, a pin 30 and a roller 40, together forming a plain bearing. In heavy duty applications such as in diesel truck engines, there is a lack of space for the implementation of a rolling bearing, thus justifying the use of a plain bearing between parts 30 and 40. Pin 30 and roller 40 are centered on a transversal axis X1, while tappet 10 is centered on a longitudinal axis Y1 of mechanical system 1. Axes X1 and Y1 are perpendicular and they have a point of intersection P1. Roller 40 is adapted to roll on a cam 2, partly shown on FIG. 6 only, in centerline. More precisely, an external surface 41 of roller 40 can roll on the outer surface of cam 2. When cam 2 and roller 40 are cooperating, a force F is applied on surface 41 along longitudinal axis Y1.

A cavity C is delimited inside tappet 10. This cavity C is adapted to receive a shaft or plunger 60, shown on FIG. 5 only, for moving tappet 10 along axis Y1. Tappet 10 is movable back and forth along axis Y1, in a non-represented bore belonging to the injection pump.

Tappet 10 has a cylindrical wall 11 centered along longitudinal axis Y1, with a first end or lower end 10.1, on the side of plunger 60, and a second end or upper end 10.2 on the side of pin 30 and roller 40. An internal surface S11 of cylindrical wall 11 delimits cavity C.

Roller 40 has an outer cylindrical surface 41 and an internal cylindrical bore 42, both centered on transversal axis X1. Pin 30 comprises a cylindrical outer surface 32 extending between pin ends 35 and 36. Surface 32 is adjusted with bore 42 of roller 40, such that roller 40 is movable in rotation relative to pin 30 around axis X1. Both pin 30 and roller 40 axes merge with transversal axis X1.

Two recesses or grooves 111 are arranged on the internal surface S11 of cylindrical wall 11 to receive ends 35 and 36 of pin 30. Grooves 111 are diametrically opposed with respect to longitudinal axis Y1 and include opposed bottom walls 13. The shapes of recesses 111 are identical. Each recess 111 opens onto lower end 10.1 of tappet 10. Along longitudinal axis Y1 and in a first direction from lower end 10.1 of tappet 10 towards upper end 10.2, each recess 111 is closed by axial abutment feature 12 formed in the thickness of cylindrical wall 11.

Figure 4:
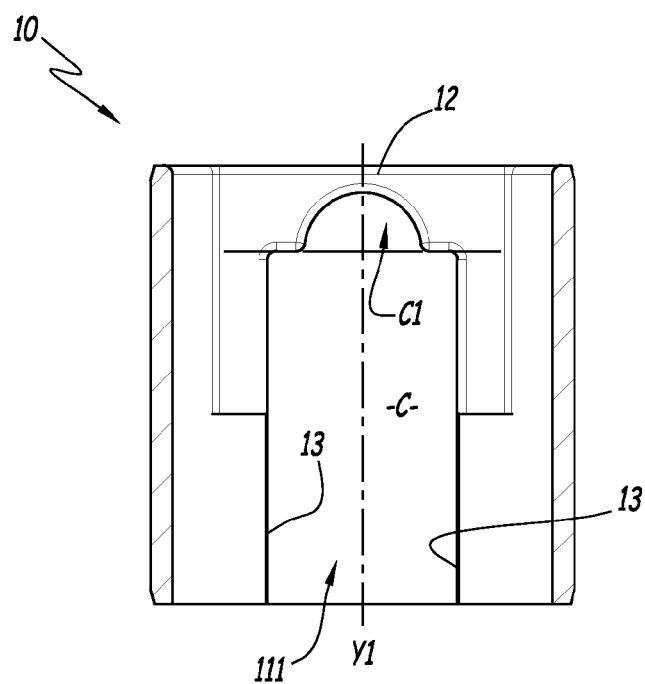
FIG. 4 is a sectional view of the tappet along plane IV of FIGS. 1 to 3.
Figure 5:
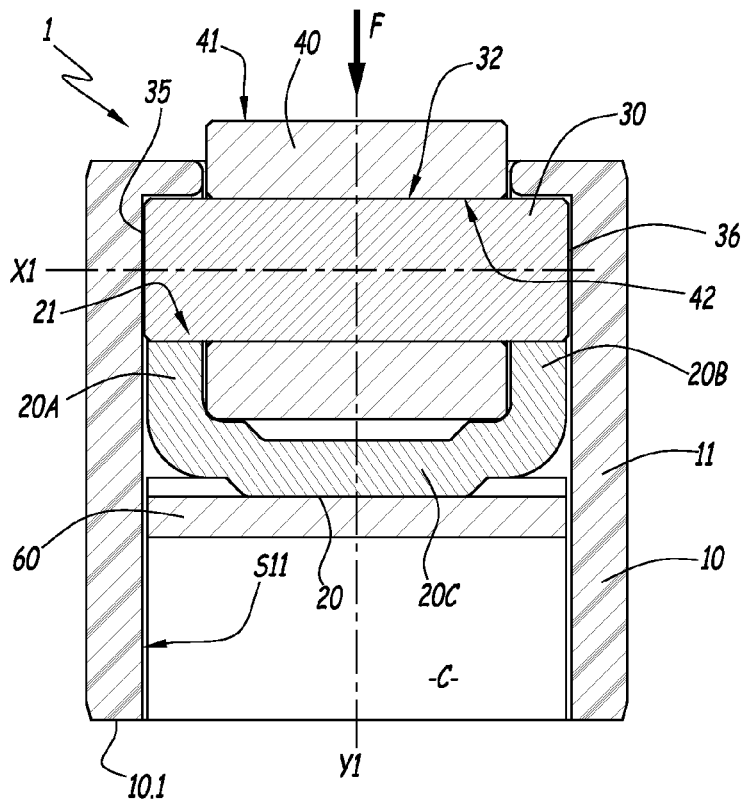
FIG. 5 is a sectional view along plane III of the mechanical system of FIG. 1.
Figure 6:
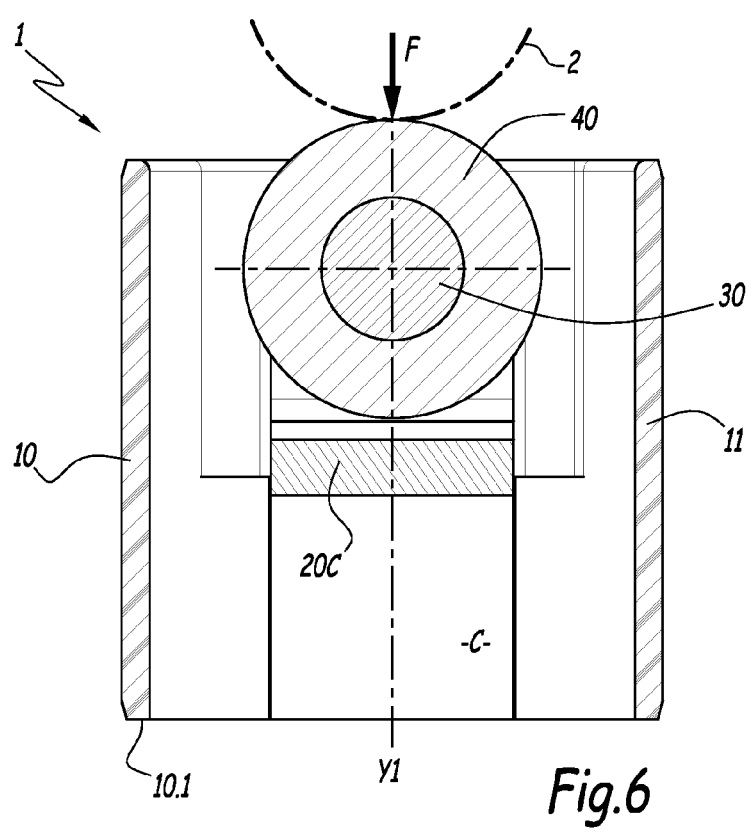
FIG. 6 is a sectional view along plane IV of the mechanical system of FIG. 1.

As shown on FIG. 4, each abutment 12 delimits a semi-cylindrical part C1 of a recess 111 centered on transversal axis X1 and having a diameter roughly equal to the diameter of pin 30. Abutment 12 blocks the translation of pin 30 along longitudinal axis Y1, in a first direction from lower end 10.1 of tappet 10 towards upper end 10.2.

In a second direction opposite the first direction, from lower end 10.1 of tappet 10 towards upper end 10.2, the translation of pin 30 along longitudinal axis Y1 is blocked by insert 20, which supports the pin 30 opposite to abutments 12.

Insert 20 is in a single piece and has a "U" shape with two parallel holding members or arms 20A and 20B linked by a base 20C perpendicular to longitudinal axis Y1. Each arm 20A and 20B is ended by a semi-cylindrical cut-off 21 having a diameter roughly equal to the diameter of pin 30 and centered on transversal axis X1. Insert 20 is press-fitted or glued in the cavity C of tappet 10. In this way, tappet 10 can not be disassembled.

Tappet 10 and insert 20 together form a support element for pin 30 and roller 40. The upper halves of ends 35 and 36 of pin 30 are housed inside part C1 of cavity C. The lower halves of ends 35 and 36 of pin 30 are housed inside cut-offs 21 of insert 20.

In diesel truck engines, tappet 10 can be made with plastic material, such as polyether ether ketone (PEEK) reinforced with glass or carbon fibers.

During operation, the load F applied by cam 2 on roller 40 is transferred to insert 20 and plunger 60 via pin 30, without going through tappet 10. Thus, tappet 10 does not need to show high mechanical properties and may have very light weight, when made in plastic material. For example, tappet 10 can be made by plastic injection or sintering.

In a variant, tappet 10 can be metallic. For example, tappet 10 can be made by stamping.

Hereunder is described a method for manufacturing mechanical system 1.

Pin 30 is fitted inside roller 40.

Then, pin 30 and roller 40 are inserted in recesses 111, from the lower end 10.1 of tappet 10, thanks to the open end of recesses 111. Pin 30 and roller 40 are translated inside recesses 111, along longitudinal axis Y1, until pin 30 comes into contact with axial abutments 12.

Then, insert 20 is inserted in recesses 111, on the lower end 10.1 of tappet 10. Insert 20 is translated inside recesses 111, along longitudinal axis Y1, until cut-offs 21 comes in abutment against pin 30.

Optionally, insert 20 is glued or attached in another way to tappet 10.

No caulking operation, or additional part, is needed for retaining pin 30 inside tappet 10.

Figure 7:
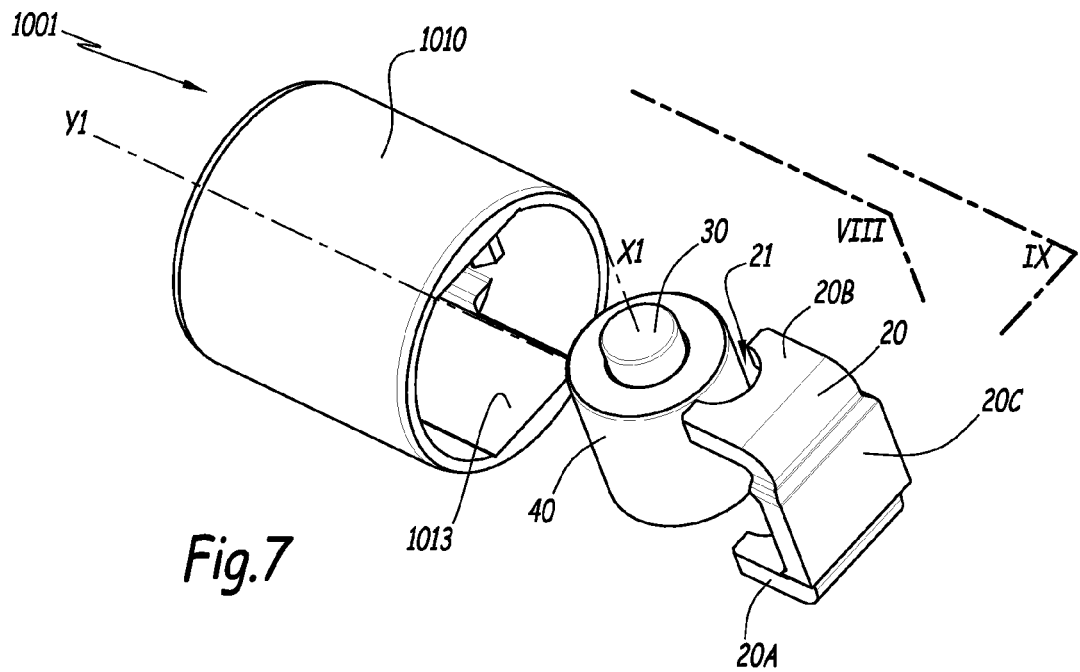
FIG. 7 is an exploded perspective view of a mechanical system according to a second embodiment.
Figure 8:
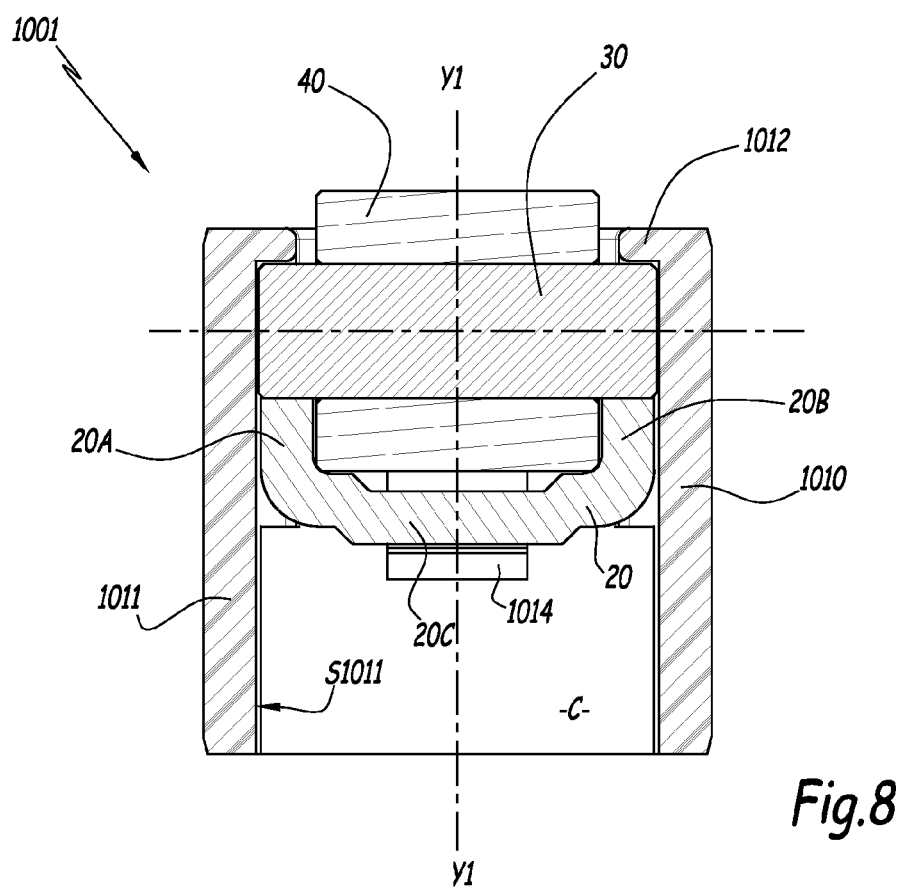
FIG. 8 is sectional view along plane VIII of FIG. 7.
Figure 9:
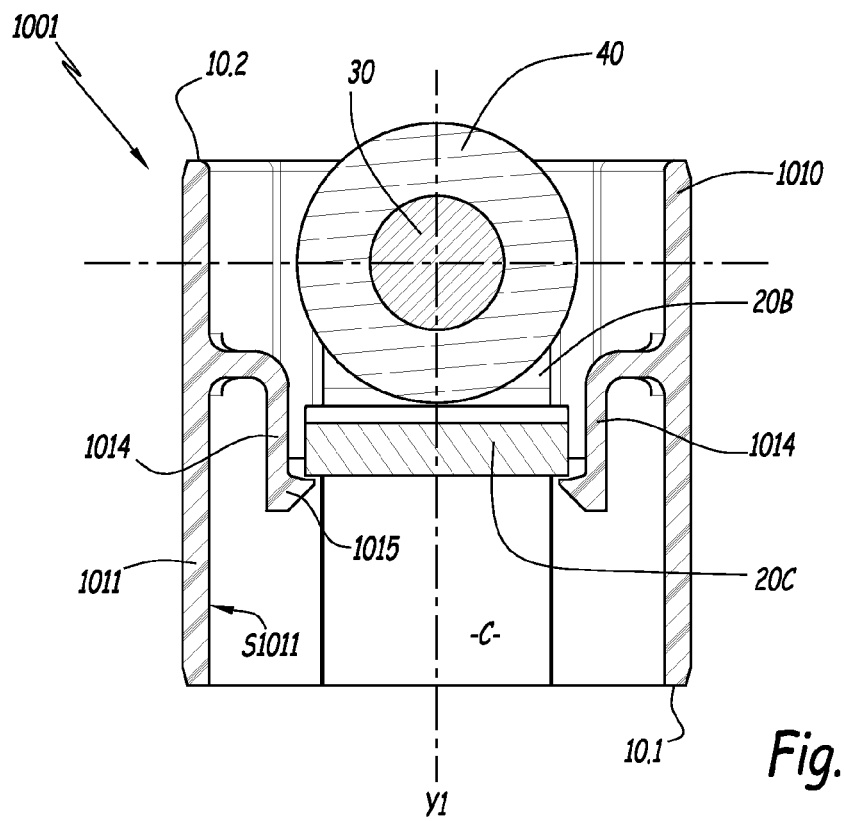
FIG. 9 is sectional view along plane XI of FIG. 7.

FIGS. 7 to 9 show a second embodiment of a mechanical system 1001. Hereinafter, the parts of mechanical system 1001 similar to corresponding parts of mechanical system 1 of FIGS. 1 to 6 bear the same references and are not described. The description focuses on differences between mechanical systems 1 and 1001.

Mechanical system 1001 includes a tappet 1010, an insert 20, a pin 30 and a roller 40. Insert 20, pin 30 and roller 40 are similar to the corresponding parts of mechanical system 1 of the first embodiment.

Tappet 1010 is made of a plastic material, such as polyether ether ketone (PEEK) reinforced with glass or carbon fibers, and has a cylindrical wall or skirt 1011 delimited by an internal surface S1011 defining a cavity C.

Two diametrically opposed elastic members 1014 protrude from internal surface S1011 of cylindrical wall 1011. Elastic holding members 1014 are bended and are ended by a tooth 1015 designed to block the translation of insert 20 along longitudinal axis Y1 in a direction from a upper end 10.2 of tappet 1010 to a lower end 10.1 of tappet 1010.

Holding members 1014 are elastically deformable in a radial direction relative to longitudinal axis Y1. In a neutral position, in other words when no load is applied to holding members 1014, teeth 1015 maintain the base 20C of insert 20 along longitudinal axis Y1.

The manufacturing method for manufacturing system 1 is similar to the method described in reference to FIGS. 1 to 6. Insert 20 is assembled to tappet 1010 by snapping, by feature of holding members 1014. During the fitting of insert 20 in cavity C of tappet 10, insert 20 elastically pushes holding members 1014 towards surface S1011, so as to allow insert 20 to come into abutment against pin 30. When insert 20 passes over holding members 1014, holding members 1014 return to their neutral position and teeth 1015 block the translation of insert 20 towards lower end 10.2 of tappet 1010.

Figure 10:
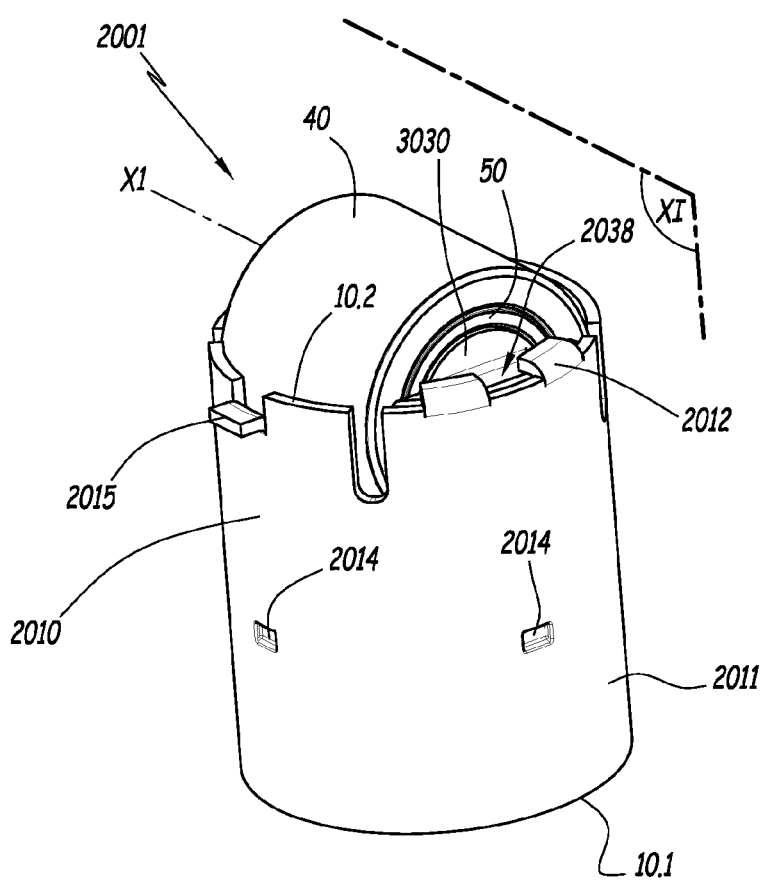
FIG. 10 is a perspective view of a mechanical system according to a third embodiment of the invention.
Figure 11:
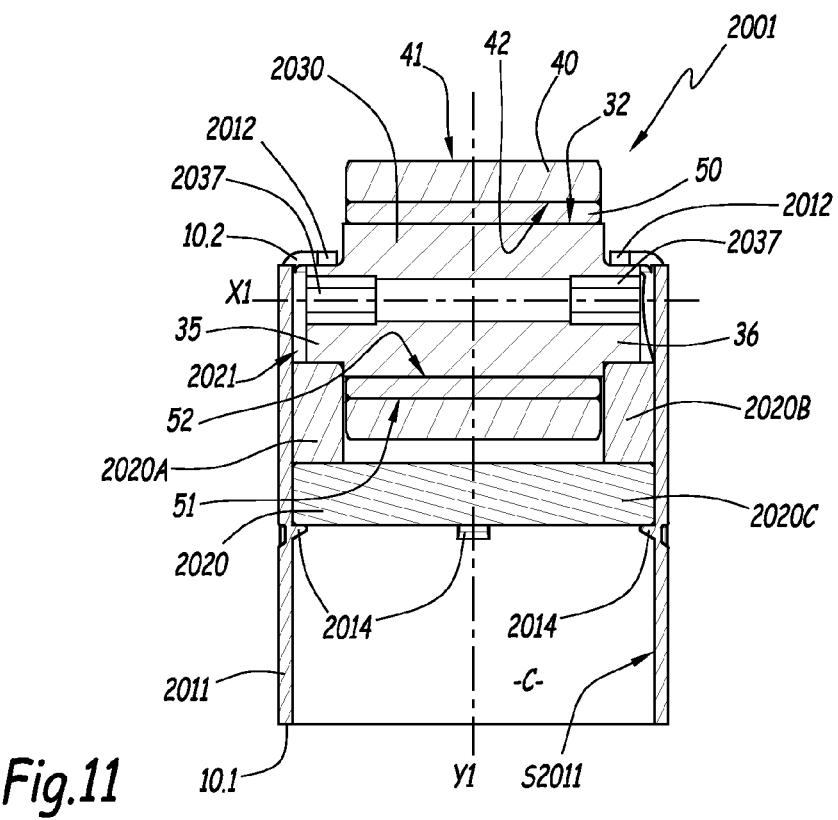
FIG. 11 is a sectional view along plane XI on FIG. 10.
Figure 12:
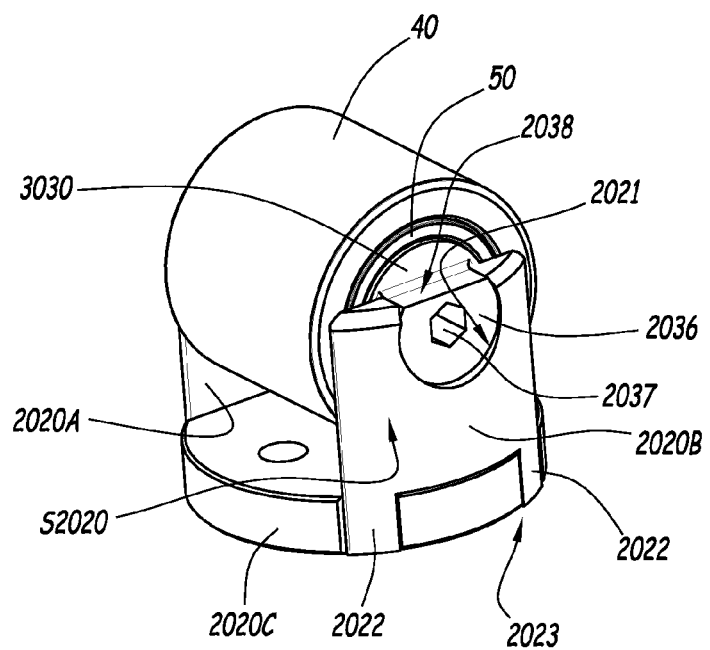
FIG. 12 is a perspective view of a pin assembly of the mechanical system of FIG. 10.

FIGS. 10 to 12 show a third embodiment of a mechanical system 2001, which is according to the invention. Hereinafter, the parts of mechanical system 2001 similar to corresponding parts of mechanical system 1 of FIGS. 1 to 6 bear the same references and are not described. The description focuses on differences between mechanical systems 1 and 2001.

Mechanical system 2001 includes a tappet 2010, an insert 2020, a pin 2030 and a roller 40. Pin 30 and roller 40 are similar to the corresponding parts of mechanical system 1 of the first embodiment.

A bushing 50 is located at the interface between pin 2030 and roller 40. Bushing 50 has an outer cylindrical surface 51 and an inner cylindrical bore 52. During assembly of system 1, surface 51 of bushing 50 is adjusted with bore 42 of roller 40, while surface 32 of pin 2030 is adjusted with bore 52 of bushing 50, such that roller 40 is movable in rotation relative to pin 2030 around axis X1. Pin 2030, roller 40 and bushing 50 axes merge with axis X1.

Tappet 2010 includes a hollow cylindrical wall or skirt 2011 centered on longitudinal axis Y1 and delimiting an internal cavity C.

Insert 2020 is made from three separate parts and includes a first holding portion 2020A and a second holding portion 2020B generally parallel with longitudinal axis Y1, and a connecting portion 2020C perpendicular to holding portions 2020A and 2020B. The holding portions 2020A and 2020B have a similar function than the abovementioned holding members 20A and 20B, respectively.

Each holding portion 2020A and 2020B is provided with a cutout 2021, for receiving on end 35 or the other 36 of pin 2030, having a truncated disc shape. The truncated part of cutouts 2021 is smaller than the diameter of the disc shape. Cutouts 2021 are centered on transversal axis X1 and have a diameter roughly equal to the diameter of pin 2030. Holding portions 2020A and 2020B have a convex external surface S2020 curved like a portion of cylinder, centered on longitudinal axis Y1, having a diameter roughly equal to the diameter of an internal surface S2011 of tappet 2010.

Each holding portion 2020A and 2020B includes several legs 2022 protruding towards lower end 10.1 of tappet 2010, for example two legs. Each leg 2022 if fitted into a corresponding notch 2023 of connecting portion 2020C.

Connecting portion 2020C is a flat disc perpendicular to longitudinal axis Y1, having a diameter roughly equal to the diameter of internal surface S2011 of tappet 2010.

Ends 35 and 36 of pin 2030 are provided with a tool cooperation member 2037, for example a hexagonal socket. The upper part 2038 of pin ends 35 and 36 is flat, so the pin ends 35 and 36 have a shape complementary to the shape of the cutouts 2021 of insert 2020.

For manufacturing mechanical member 2001, roller 40 and bushing 50 are fitted around pin 30. Pin ends 35 and 36 are inserted inside cutouts 2021 with the flat part 2038 of pin 2030 parallel to longitudinal axis Y1.

Then, pin 2030 is rotated of 90° around transversal axis X1 with respect to insert 2020, until flat part 2038 of pin 2030 is perpendicular to longitudinal axis Y1. As truncated part of cutouts 2021 is smaller than the diameter of the disc shape, the translation of pin 2030 along longitudinal axis Y1, with respect to insert 2020, is blocked in the two opposite directions.

In a first direction from lower end 10.1 of tappet 2010 towards upper end 10.2, the translation of pin 2030 along longitudinal axis Y1 is blocked by tabs 2012 of tappet 2010 forming a first axial abutment. Tabs 2012 are external with respect to cavity C. Each pin end 35 and 36 is blocked by two tabs 2012 extending on one side and another of transversal axis X1. For example, tabs 2012 are made by bending a portion of tappet 2010.

Between each pair of tabs 2012, upper end 10.2 of tappet 2010 is provided with an anti-rotation member 2015 for blocking the rotation of tappet 2010 when it is fitted in a cylinder. Anti-rotation member 2015 is formed by a tab which extends radially outwardly with respect to wall or skirt 2011.

In a second direction opposite the first direction, from upper end 10.2 of tappet 10 towards lower end 10.1, the translation of pin 2030 along longitudinal axis Y1 is stopped by second axial abutment feature formed by protrusions 2014 protruding inside cavity C. For example, protrusions 2014 are made by locally stamping cylindrical wall 2011, when insert 2020 is already fitted inside tappet 2010.

In the first, second and third embodiments, pin assemblies of mechanical members 1, 1001 and 2001 are formed by pin 30 only.

Figure 13:
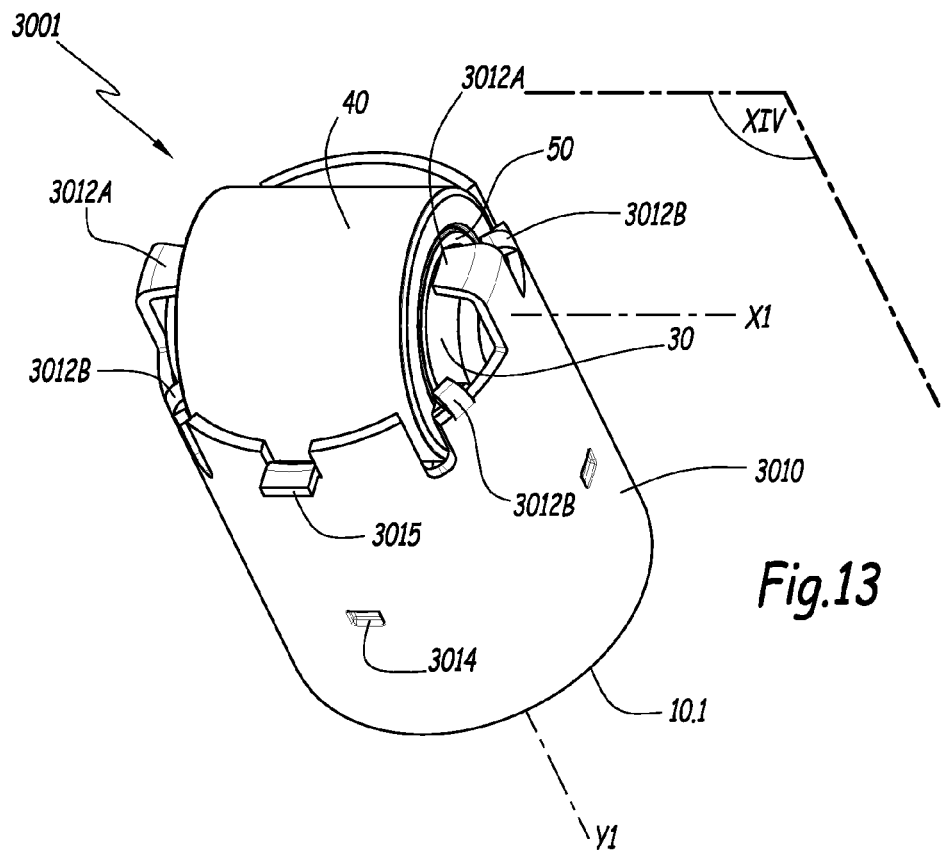
FIG. 13 is a perspective view of a mechanical system according to a fourth embodiment of the invention.
Figure 14:
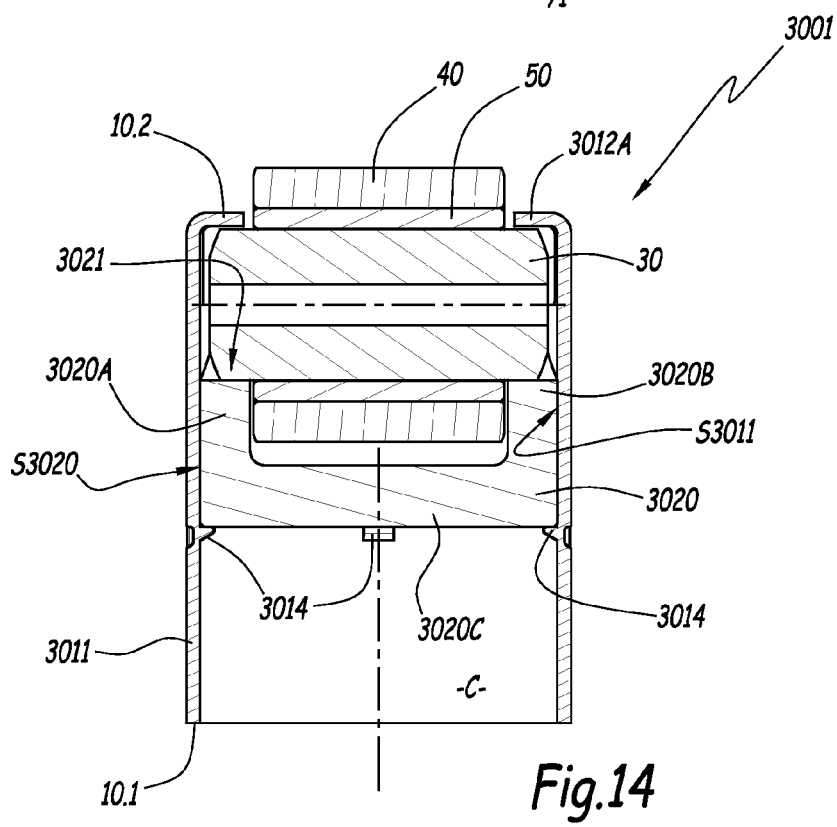
FIG. 14 is a sectional view along plane XIV on FIG. 13.

FIGS. 13 to 14 show a fourth embodiment of a mechanical system 3001, which is according to the invention. Hereinafter, the parts of mechanical system 3001 similar to corresponding parts of mechanical system 1 of FIGS. 1 to 6 bear the same references and are not described. The description focuses on differences between mechanical systems 3001 and 2001.

Mechanical system 3001 includes a tappet 3010, an insert 3020, a pin 30, a roller 40 and a bushing 50.

Tappet 3010 includes a hollow cylindrical wall or skirt 3011 centered on longitudinal axis Y1 and delimiting an internal cavity C.

Insert 2020 is made in a single piece and includes a first holding portion 3020A and a second holding portion 3020B generally parallel with longitudinal axis Y1, and a connecting portion 3020C perpendicular to holding portions 3020A and 3020B.

Each holding portion 3020A and 3020B is provided with a cutout 3021 for receiving one end 35 or 36 of pin 30, having a semi-circular shape. Cutouts 3021 are centered on transversal axis X1 and have a diameter roughly equal to the diameter of pin 30. Holding portions 3020A and 3020B have a convex external surface S3020 curved like a portion of cylinder, centered on longitudinal axis Y1, having a diameter roughly equal to the diameter of an internal surface S3011 of tappet 3010.

Connecting portion 3020C is a flat disc perpendicular to longitudinal axis Y1, having a diameter roughly equal to the diameter of internal surface S3011 of tappet 3010.

Insert 3020, pin 30, roller 40 and bushing 50 form a pin assembly movable in translation inside cavity C of tappet 3010, comparable to pin 30 of the first and second embodiments.

For manufacturing mechanical member 3001, roller 40 and bushing 50 are fitted around pin 30.

Then, pin 30, roller 40 and bushing 50 are inserted inside cavity C until pin 30 comes into abutment with tabs 3012A of tappet 3010, forming a first axial abutment.

In a first direction from lower end 10.1 of tappet 2010 towards upper end 10.2, the translation of pin assembly along longitudinal axis Y1 is blocked by tabs 2012A protruding from upper end 10.2 of tappet 10. Tabs 3012A are external with respect to cavity C. Each pin end 35 and 36 is blocked by a tab 3012A.

Between tabs 3012A, upper end 10.2 of tappet 2010 is provided with an anti-rotation member 3015 for blocking the rotation of tappet 3010 when it is fitted in a cylinder and extending radially outwardly with respect to wall or skirt 2011.

In a second direction opposite the first direction, from upper end 10.2 of tappet 10 towards lower end 10.1, the translation of pin assembly along longitudinal axis Y1 in stopped by a second axial abutment formed by protrusions 3014 protruding inside cavity C.

Upper end 10.2 of tappet 3010 has additional tabs 3012B located on one side and another of each tab 3012A. Additional tabs 3012B prevent pin assembly 3020, 30, 40, 50 from rotating around longitudinal axis Y1 with respect to tappet 3010.

Figure 15:
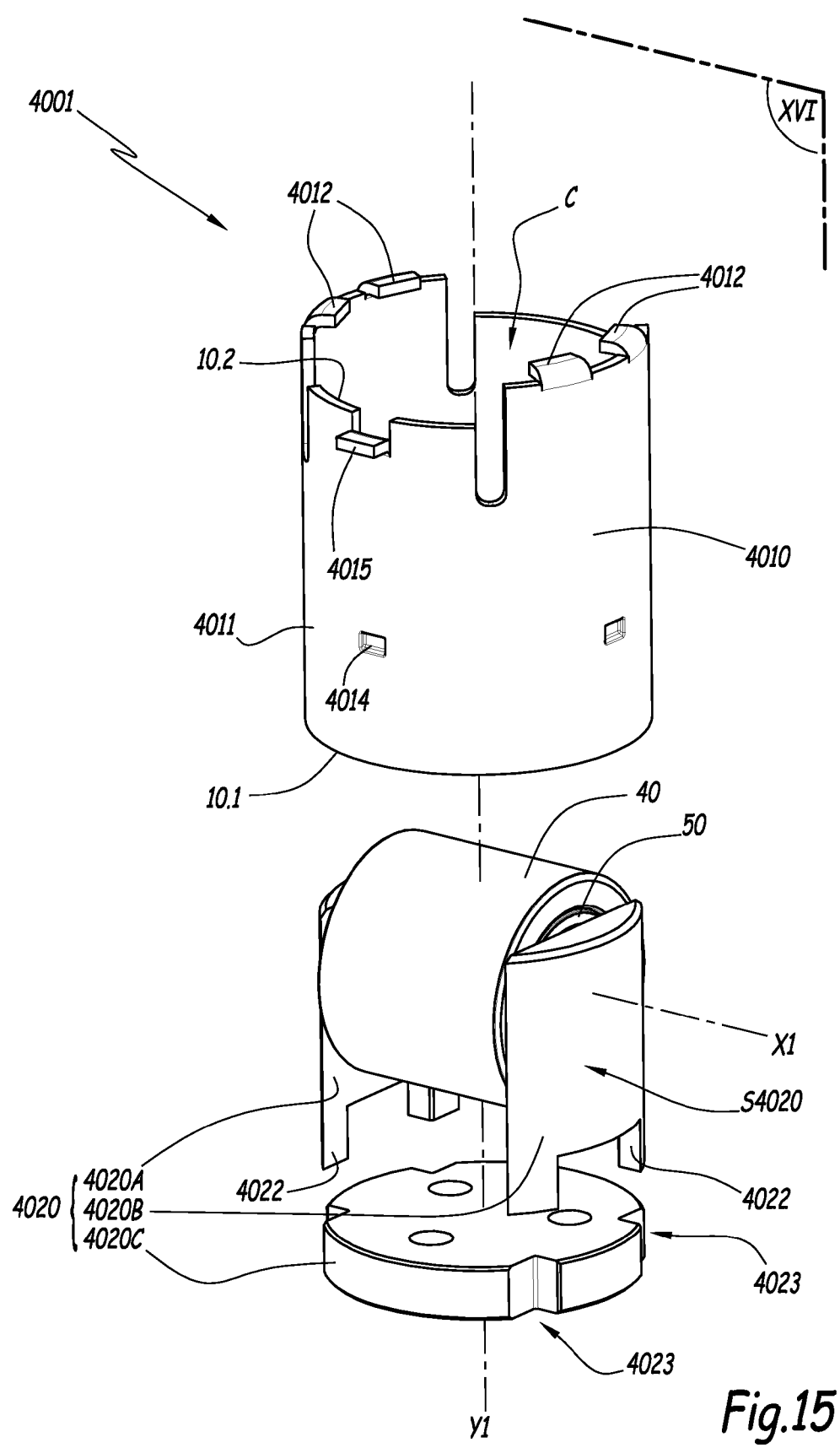
FIG. 15 is a perspective view of a mechanical system according to a fifth embodiment of the invention.
Figure 16:
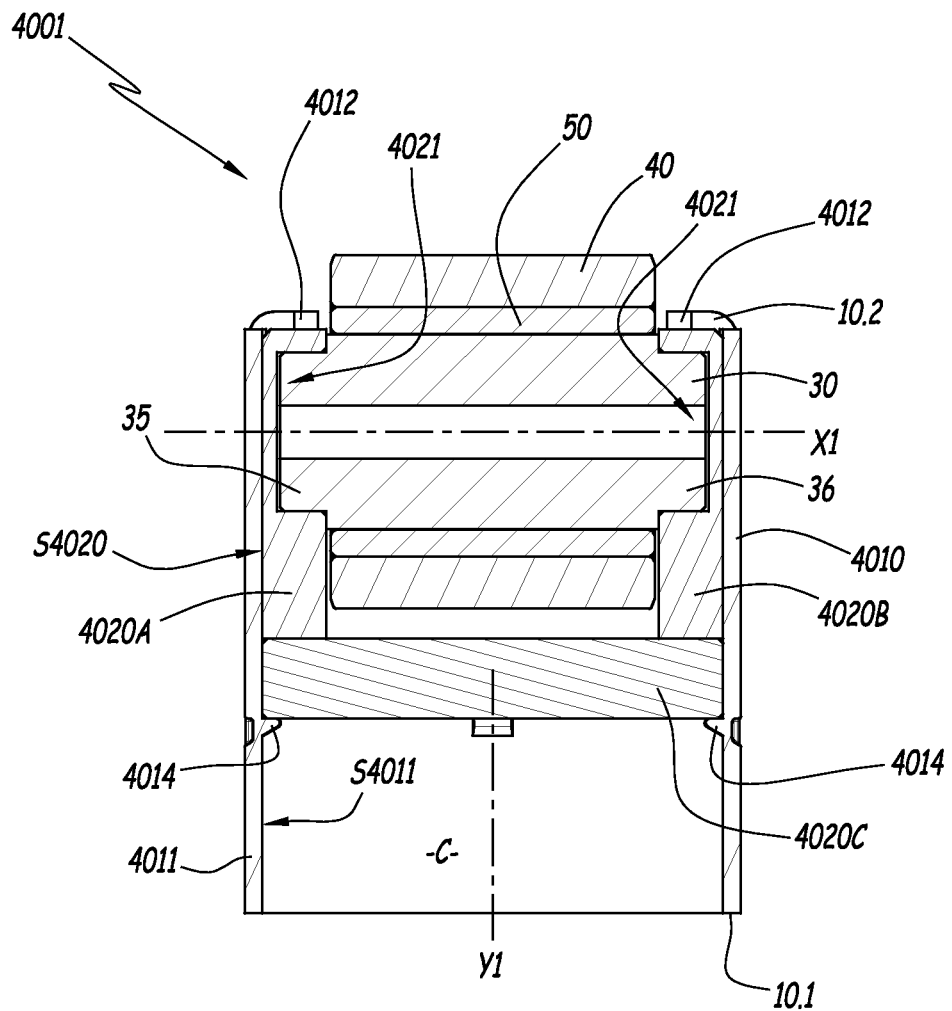
FIG. 16 is a sectional view along plane XVI on FIG. 15.

FIGS. 15 to 16 show a fifth embodiment of a mechanical system 4001, which is according to the invention. Hereinafter, the parts of mechanical system 4001 similar to corresponding parts of mechanical system 1 of FIGS. 1 to 6 bear the same references and are not described. The description focuses on differences between mechanical systems 4001 and 2001.

Mechanical system 4001 includes a tappet 4010, an insert 4020, a pin 30, a roller 40 and a bushing 50.

Tappet 4010 includes a hollow cylindrical wall or skirt 4011 centered on longitudinal axis Y1 and delimiting an internal cavity C.

Insert 4020 is made of different separate pieces and includes a first holding portion 4020A and a second holding portion 4020B generally parallel with longitudinal axis Y1, and a connecting portion 4020C perpendicular to holding portions 4020A and 4020B.

Each holding portion 4020A and 4020B is provided with a blind circular recess 4021 for receiving one end 35 or 36 of pin 30. Recesses 4021 are centered on transversal axis X1 and have a diameter roughly equal to the diameter of pin 30. Holding portions 4020A and 4020B have a convex external surface S4020 curved like a portion of cylinder having a diameter roughly equal to the diameter of an internal surface S4011 of tappet 4010.

Connecting portion 4020C is a flat disc perpendicular to longitudinal axis Y1, having a diameter roughly equal to the diameter of internal surface S4011 of tappet 4010.

Insert 4020, pin 30, roller 40 and bushing 50 form a pin assembly movable in translation inside cavity C of tappet 4010.

For manufacturing mechanical member 4001, roller 40 and bushing 50 are fitted around pin 30.

Then, holding members 4020A and 4020B of insert 4020 are assembled with pin 30, with pin ends 35 and 36 engaged inside recesses 4021.

Then, legs 4022 of holding members 4020A and 4020B are fitted inside notches 4023 of connecting portion 4020C.

Then, pin assembly 4020, 30, 40, 50 is inserted inside tappet 4010 until it comes into abutment with tabs 4012 of tappet 3010, forming a first axial abutment.

In a first direction from lower end 10.1 of tappet 4010 towards upper end 10.2, the translation of pin assembly along longitudinal axis Y1 is blocked by tabs 4012 protruding from upper end 10.2 of tappet 4010. Tabs 4012 are external with respect to cavity C. Each holding portion 4020A or 4020B, thus each pin end 35 and 36 is blocked by two tabs 4012.

In a second direction opposite the first direction, from upper end 10.2 of tappet 10 towards lower end 10.1, the translation of pin assembly along longitudinal axis Y1 is stopped by a second axial abutment formed by protrusions 4014 protruding inside cavity C.

In all embodiments, the cylindrical walls or skirts 11, 1011, 2011, 3011 and 4011 of tappets 10, 1010, 2010, 3010 and 4010 form retaining feature for blocking the translation of pin 30 or 2030 along transversal axis X1.

In a non-depicted variant, bushing 50 is eliminated or replaced by another type of sliding element, such as needle roller bearings with plastic cage, used for injection pumps for gasoline engines.

Other non-show embodiments can be implemented within the scope of the invention. For example, support element 2020, 3010 or 4010 may have a different configuration depending on the intended application of system 2001, 3001 or 4001. Support element 10, 1010 may also have a different configuration depending on the intended application of system 1, 1001.

Moreover, the mechanical system 1, 1001, 2001, 3001 or 4001 is not limited to a cam follower. For example, system 1, 1001, 2001, 3001 or 4001 may form a rocker arm, wherein the support element 10, 1010, 2010, 3010 or 4010 is an arm movable in rotation along a pivot axis parallel to axis X1.

According to another non-shown embodiment, system 1 may comprise a rolling or sliding bearing, with bearing elements positioned at the interface between pin 30 and roller 40.

In addition, technical features of the different embodiments can be, in whole or part, combined with each other. Thus, mechanical systems can be adapted to the specific requirements of the application.

What is claimed is:

1. A mechanical system forming one of a cam follower or a rocker arm, the mechanical system comprising:
    a support element;
    a pin extending between two opposite ends along a first axis and supported by the support element; and
    a roller mounted on the pin, movable in rotation relative to the pin around the first axis and adapted to roll on a cam;
    the support element comprising a first axial abutment feature blocking a translation of at least the pin in a first direction parallel to a second axis perpendicular to the first axis; and
    an insert inserted in the support element and supporting the pin opposite the first axial abutment feature,
    wherein the first axial abutment feature protrudes outside a cavity delimited by the support element,
    wherein the support element comprises a cylindrical wall defining a cylinder interior and having a first end and a second end spaced from the first end in the first direction, wherein the second end comprises an end edge lying in a plane, wherein the first axial abutment feature is located at the second end, and wherein the first abutment feature projects axially away from the plane and extends radially over the cylinder interior.

2. The mechanical system according to claim 1, wherein the cylindrical wall extends around the pin and blocks the translation of the pin along the first axis.

3. The mechanical system according to claim 1, wherein the first axial abutment feature blocks a translation of the insert in the first direction.

4. The mechanical system according to claim 1, wherein the insert is in a single piece and has holding members supporting the pin ends.

5. The mechanical system according to claim 1, wherein the insert is made from separate parts and further includes a first holding portion and a second holding portion supporting the pin.

6. The mechanical system according to claim 1, wherein the insert is one of glued or press-fitted inside the support element.

7. The mechanical system according to claim 1, further comprising a second abutment feature blocking a translation of the pin and the insert in a second direction opposite the first direction, the second abutment feature including protrusions stamped from the cylindrical wall of the support element.

8. The mechanical system according to claim 1, wherein the mechanical system is integrated into an injection pump for a motor vehicle.

9. The mechanical system according to claim 1, wherein the mechanical system is integrated into a valve actuator for a motor vehicle.

10. The mechanical system according to claim 1, wherein the first axial abutment feature comprises at least one tab.

11. A method for manufacturing a mechanical system, the mechanical system comprising:
    a support element comprising a cylindrical wall defining a cylinder interior and having a first end and a second end spaced from the first end in a first direction, wherein the second end comprises an end edge lying in a plane;
    a pin extending between two opposite ends along a first axis and supported by the support element; and
    a roller mounted on the pin, movable in rotation relative to the pin around the first axis and adapted to roll on a cam;
    the support element comprising a first axial abutment feature located at the second end and blocking a translation of at least the pin in the first direction parallel to a second axis perpendicular to the first axis, the first axial abutment feature projecting axially away from the plane and extending radially over the cylinder interior; and
    an insert inserted in the support element and supporting the pin opposite the first axial abutment feature,
    wherein the first axial abutment feature protrudes outside a cavity delimited by the support element,
    the method comprising steps of:
    assembling the pin and the roller together;
    inserting the pin and the roller into the support element until the pin comes into contact with the first axial abutment feature; and
    inserting the insert into the support element until it comes into contact with the pin.

12. The method according to claim 11, wherein the first axial abutment feature comprises at least one tab.

13. A method for manufacturing a mechanical system, the mechanical system comprising:
    a support element comprising a cylindrical wall defining a cylinder interior and having a first end and a second end spaced from the first end in a first direction, wherein the second end comprises an end edge lying in a plane;
    a pin extending between two opposite ends along a first axis and supported by the support element; and
    a roller mounted on the pin, movable in rotation relative to the pin around the first axis and adapted to roll on a cam;
    the support element comprising a first axial abutment feature located at the second end and blocking a translation of at least the pin, in the first direction parallel to a second axis perpendicular to the first axis, the first abutment feature projecting axially away from the plane and extending radially over the cylinder interior; and
    an insert inserted in the support element and supporting the pin opposite the first axial abutment feature,
    wherein the first axial abutment feature protrudes outside a cavity delimited by the support element,
    wherein the insert is made from separate parts and further includes a first holding portion and a second holding portion supporting the pin,
    wherein each holding portion has a cylindrical recess having a diameter substantially equal to the diameter of the pin,
    the method comprising steps of:
    assembling the pin and the roller together;
    assembling the holding portions of the insert with the pin, wherein the pin ends are located inside the cylindrical recesses; and
    inserting the pin and the insert inside the support element until the pin or the insert comes into abutment with the first axial abutment feature.

14. The method according claim 13, wherein the first axial abutment feature comprises at least one tab.

* * * * *